March 10, 1931. R. B. OTWELL 1,795,734
COMBINED AIR HEATER AND EXHAUST MANIFOLD
FOR INTERNAL COMBUSTION ENGINES
Filed April 5, 1929 2 Sheets-Sheet 1

Inventor
Ralph B. Otwell
By S. E. Thomas
Attorney

March 10, 1931.                R. B. OTWELL                    1,795,734
                 COMBINED AIR HEATER AND EXHAUST MANIFOLD
                        FOR INTERNAL COMBUSTION ENGINES
                            Filed April 5, 1929         2 Sheets-Sheet 2
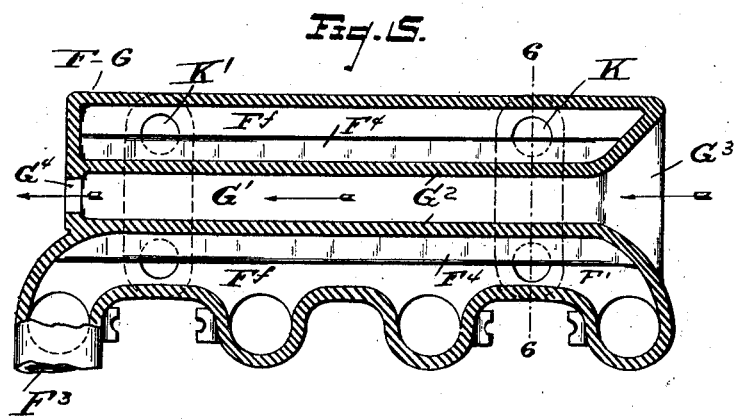
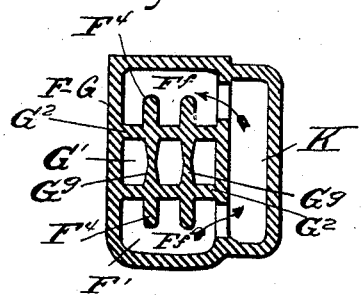
Inventor
Ralph B. Otwell
By S. E. Thomas
Attorney Patented Mar. 10, 1931

1,795,734

UNITED STATES PATENT OFFICE

RALPH B. OTWELL, OF DETROIT, MICHIGAN

COMBINED AIR HEATER AND EXHAUST MANIFOLD FOR INTERNAL-COMBUSTION ENGINES

Application filed April 5, 1929. Serial No. 352,774.

My invention relates to a heater for motor driven vehicles, in which the hot gases discharged into the exhaust manifold are utilized to heat air delivered to the vehicle body for warming the vehicle when operating in cold climates;—it being adapted also to contract the volume of the hot gases in the exhaust manifold thus reducing back pressure and thereby indirectly increasing the power of the engine, whether employed to heat the vehicle or not.

It is well known that auto-motive engineers have been urging for some time past better design of the exhaust system of internal combustion engines to reduce back pressure, suggesting that exhaust manifolds be air-cooled to quickly contract the volume of the hot gases and thus increase the power of the engine.

It is therefore the primary object of the present invention to increase the efficiency of the heater by increasing the radiating surface over which the exhaust passes that it may be more particularly adapted for extremely cold climates, by quickly absorbing the heat of the hot gases delivered to the exhaust manifold and thence to the air heating chamber, thereby rapidly heating the cold air to a relatively high temperature necessary in very cold climates, while simultaneously reducing the back pressure from the manifold to increase the power of the engine.

A further object of the invention is to provide means whereby the delivery of hot air may be manually cut off from the body of the vehicle during warm weather, without in any way minimizing the operation of the means employed to effect a reduction of the temperature of the exhaust gases delivered into the manifold, for increasing the efficiency of the engine, by the elimination of back pressure, regardless of weather conditions.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1:
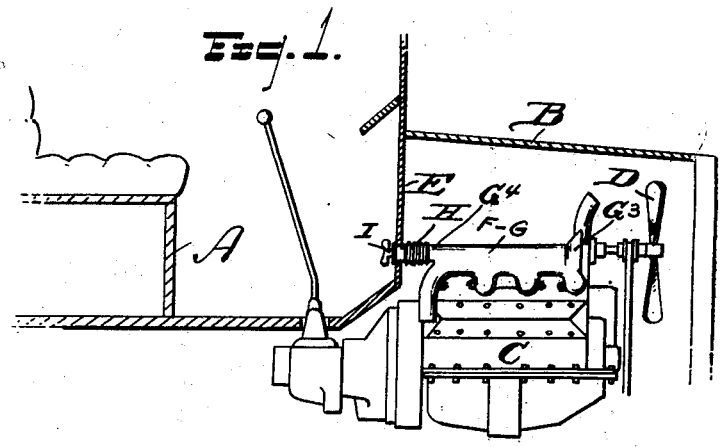
Figure 1 is a fragmentary diagrammatical elevation with parts in section of an automobile and its power plant showing my invention installed therein.
Figure 2:
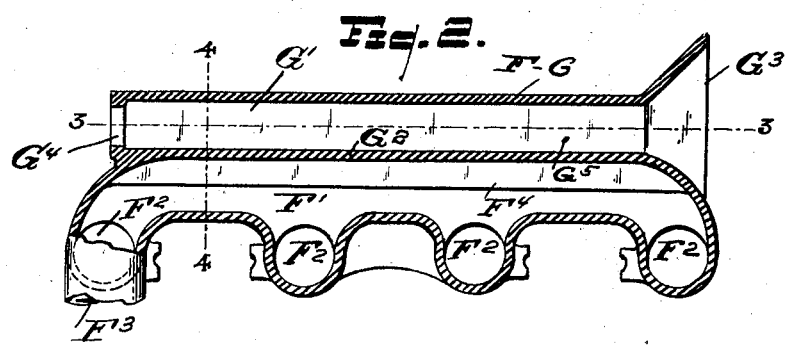
Figure 2 is a longitudinal vertical sectional view through the heating device and the integral exhaust manifold, showing in elevation one of the longitudinal heat absorbing fins depending from the wall dividing the air heating chamber from the exhaust manifold.
Figure 3:
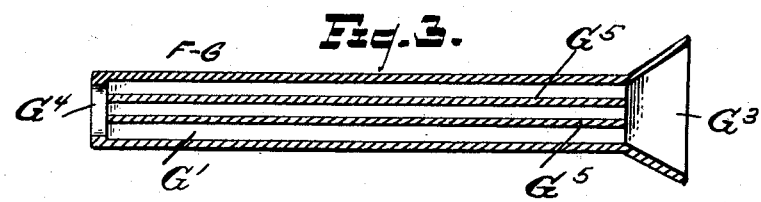
Figure 3 is a horizontal longitudinal sectional view taken on or about line 3—3 of Figure 2.
Figure 4:
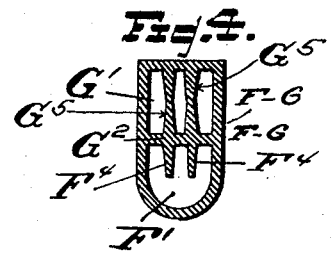
Figure 4 is a cross-sectional view of the device taken on or about line 4—4 of Figure 2.

Figure 5 is a longitudinal vertical sectional view through a modification of the device increasing the area of the exhaust manifold by providing a pair of connected chambers located respectively above and below the air chamber passage—with heat absorbing fins integral with the partition walls dividing the exhaust chambers from the air chamber passage, extending into the respective chambers of the exhaust manifold.

Figure 6 is a cross-sectional view taken on or about line 6—6 of Figure 5.

Referring now to the letters of reference placed upon the drawings:

A denotes a motor driven vehicle, B its hood, C the engine, D the usual fan and E the dash-board of the vehicle.

F—G indicates a combined exhaust gas manifold and air heater, in which $F^1$ is the exhaust, and $G^1$ the air heating chamber. $F^2$ are ports opening into the exhaust chamber, and $F^3$ is a discharge outlet therefrom.

An integral partition wall $G^2$, divides the air heating chamber from the exhaust chamber or manifold and serves to quickly transmit the heat from the exhaust gases in the manifold to the heating chamber that the temperature of the air passing through the latter may be raised.

$G^3$ indicates a funnel-shaped opening at the forward end of the heater,—which due to its location adjacent the fan D, receives and directs air into and through the heating chamber.

G⁴ denotes a discharge opening at the opposite end of the air heating chamber.

G⁵ indicates a plurality of longitudinal partition walls spaced apart extending the entire length of the heating chamber, between which the air passes that it may be rapidly heated on its way to the car body.

F⁴ are a plurality of fins integral with and depending from the partition wall G² into the exhaust chamber F¹, to assist in quickly absorbing the heat of the exhaust gases for transmission through the wall G² into the partition walls G⁵ thereby greatly increasing the temperature of the air as it is forced by the fan D through the heating chamber to the body of the vehicle or released to the open air as desired.

In the modification shown in Figures 5 and 6, the exhaust manifold F¹ is divided,—the respective chambers F' being located above and below the air chamber G¹ which is also divided by longitudinal partition walls G⁵ integral with the walls G² dividing the manifold from the air chamber. Projecting into the divided chambers of the exhaust manifold and integral with the upper and lower walls of the air divided chamber are fins F⁴ for conducting the heat absorbed from the exhaust gases into the air chamber, thereby raising the temperature of the air passing through the latter.

K and K¹ are ports connecting the divided exhaust manifold together at each end.

H denotes a flexible pipe of bellows-like form connecting the exhaust end G⁴ of the heater with a two-way valve I, adapted to control the delivery of the heated air into the vehicle, or under the hood B,—thence to the open air.

Having indicated the several parts by reference letters, the construction and operation of the device will be readily understood.

When it is necessary to heat the body of the vehicle, the two-way valve I, is turned to permit the heated air delivered from the heating chamber to pass into the body of the vehicle.

The modification shown in Figures 5 and 6 is designed more particularly for use in localities wherein the winters are prolonged with very low prevailing temperatures throughout the season.

Its increased radiating capacity furnishing ample heat for all weather conditions.

During warm weather or whenever it is desired to cut off the supply of heated air to the vehicle, the two-way valve is turned to discharge the heated air under the hood covering the power plant, that it may pass to the outside air.

No attempt has been made to show the construction of the two-way valve as such valves are known and their operation well understood.

It will be seen however that the present device may be used effectively either in the winter to heat the vehicle, or at any season to quickly contract the volume of the exhaust gases,—thereby reducing back pressure, and thus increasing the power of the engine.

Having described my invention, what I claim is:

1. A device of the character described, comprising a combined exhaust manifold and an air heating chamber, in which the air heating chamber is disposed on top of the exhaust manifold and which is divided from the exhaust manifold by a substantially horizontal partition wall integral with the side walls of the device, the exhaust manifold and said chamber being of substantially the same width; a plurality of longitudinally disposed partition walls integral with the horizontal partition wall and with the upper wall of the air chamber, providing a plurality of narrow longitudinally disposed parallel air passages in the air chamber through which air may pass in narrow unobstructed channels over a relatively large radiating surface; and a plurality of fins integral with and depending downwardly from the horizontal partition wall into the exhaust manifold, whereby a relatively large radiating surface is provided within the exhaust manifold, adapted to receive the heat of the exhaust gases passing over and between the fins, and for conducting the same to the horizontal wall and the partition walls within the air chamber, as and for the purposes described.

2. In an internal combustion engine for a motor driven vehicle, a device of the character described comprising an exhaust manifold and an air heating chamber separated from each other by a substantially horizontal partition wall integral with the side walls of the device, said air heating chamber being of substantially the same width as the width of the exhaust manifold and disposed on the latter and divided by a plurality of vertical partition walls spaced apart to provide continuous, unbroken, narrow air passages over a plural number of heating surfaces extending the length of the chamber; a plurality of fins depending downwardly from said horizontal partition wall into the exhaust chamber to provide a relatively enlarged radiating surface within the exhaust chamber, whereby the heat from the exhaust chamber is quickly conducted to the partition walls and radiated within the air chamber; a flexible pipe connection between the discharge opening of the air heating chamber and the body of the vehicle; and a valve adapted to control the delivery of the heated air to the vehicle.

3. A device of the character described comprising an exhaust manifold provided with spaced internal longitudinal partitions spaced from the upper and lower walls thereof to provide an interior air chamber and separate exhaust passages above and below the air chamber, the exhaust passages having communication with each other at each end, said air chamber having spaced longitudinal partitions forming relatively narrow air passages opening through the ends of the device.

4. A device of the character described comprising an exhaust manifold provided with spaced internal longitudinal partitions spaced from the upper and lower walls thereof to provide an interior air chamber and separate exhaust passages above and below the air chamber, the exhaust passages having communication with each other at each end, said air chamber having spaced longitudinal partitions forming relatively narrow air passages opening through the ends of the device, the exhaust manifold portions having fins projecting into the respective separate exhaust chambers.

In testimony whereof, I sign this specification.

RALPH B. OTWELL.